(No Model.)
J. BEAUDREAU.
ROWLOCK.
No. 271,021. Patented Jan. 23, 1883.
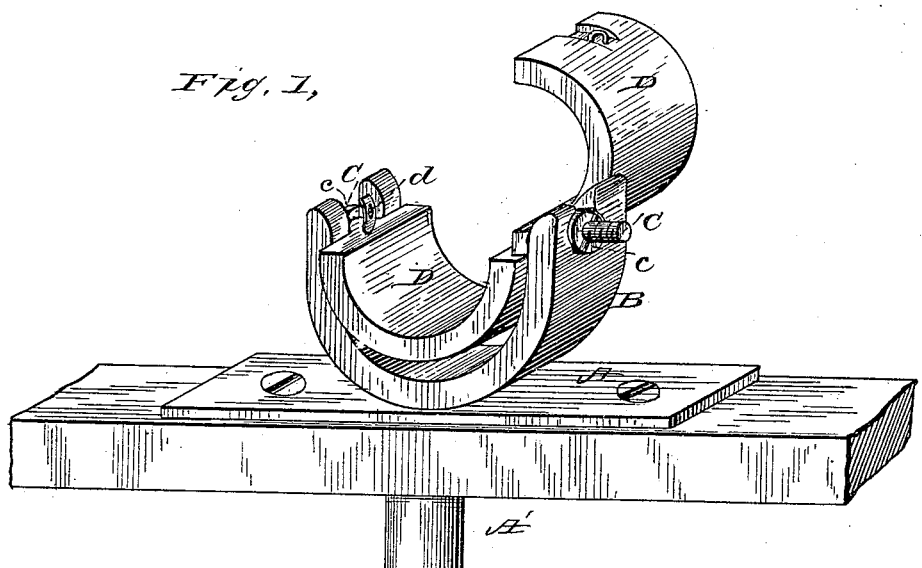
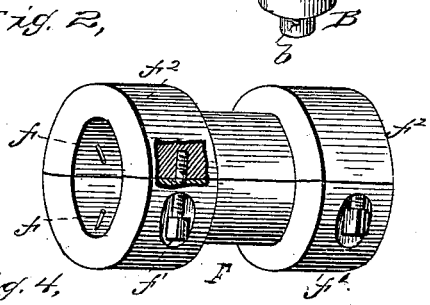
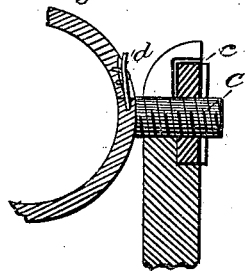
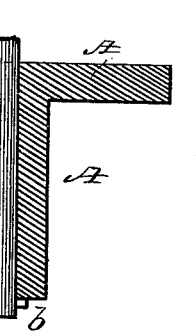
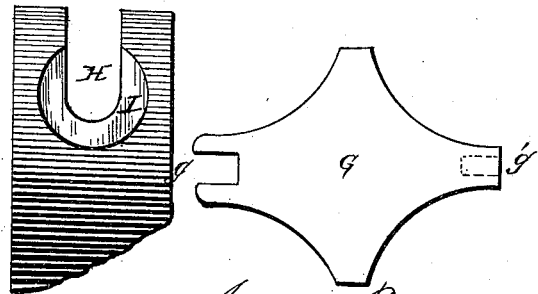
WITNESSES:
Fred. G. Dieterich
Charles H. Baker
Joseph Beaudreau
INVENTOR,
by Louis Bagger & Co
ATTORNEYS

UNITED STATES PATENT OFFICE.

JOSEPH BEAUDREAU, OF LUDINGTON, MICHIGAN.

ROWLOCK.

SPECIFICATION forming part of Letters Patent No. 271,021, dated January 23, 1883.

Application filed October 24, 1882. (No model.)

*To all whom it may concern:*

Be it known that I, JOSEPH BEAUDREAU, of Ludington, in the county of Mason and State of Michigan, have invented certain new and useful Improvements in Rowlocks; and I do hereby declare that the following is a full, clear, and exact description of the invention, which will enable others skilled in the art to which it appertains to make and use the same, reference be had to the accompanying drawings, which form a part of this specification.

My invention relates to rowlocks or oar-locks for boats; and the novelty consists in the construction and arrangement of parts, as will be more fully hereinafter set forth, and specifically pointed out in the claims.

The object of the invention is to produce an uncomplicated and efficient oar-lock which will allow all necessary play to the oar with a minimum of friction, and which will not unship in the roughest water.

The device is fully illustrated in the accompanying drawings, which form a part of this specification, and in which—

Figure 1 is a perspective view with the clamp open and the oar-sleeve removed; Fig. 2, a detail perspective of the oar-sleeve broken away to show the securing means; Fig. 3, a detail section showing the rock-shaft bearings, securing means, and the clamp with its spring-catch; Fig. 4, a central section of the boat-bracket; and Fig. 5 is an end detail view, showing the recess for securing the nut upon the rock-shaft.

Referring to the drawings, A represents the boat-bracket, secured by screws to the boat's gunwale, and having a cylindrical arm, A', in which is formed an internal longitudinal groove, $a$. In this arm A' operates the shank of the U-frame B, upon which is formed a pin, $b$. When the U-frame is being placed in position the pin $b$ rides down the recess or groove $a$, after which, by giving the said frame a half-turn, the pin $b$ rides under the end of the tubular arm A, and is securely locked in that position. In the upper extremities of the U-frame I provide journals for a rock-shaft, C, carrying a hinged clamp, D, provided with a spring-catch, $d$, as shown. The bearings for the rock-shaft C are formed by vertical slots H in the ends of the U-shaped frame B, and the shafts are secured by circular nuts $c$, which are screwed upon their ends, and sink into circular recesses I in the outer sides of the frames, which receive them and hold them and the shafts fast.

F represents the oar-sleeve, consisting of hinged sections having internally-projecting pins $f$, which serve to hold the oar and sleeve firmly together. The sleeve is locked upon the oar by screws $f'$, and it is provided externally with annular flanges $f^2$, which operate upon either side of the clamp to hold the parts together. This sleeve is adapted to be left upon the oar. A catch-key, G, is provided, having a portion, $g$, which operates the rock-shaft nuts, and a portion, $g'$, which operates the sleeve-screws $f'$.

The operation of the invention is obvious. By a single half-turn of the U-frame B, all the working parts may be readily released and stored, while the same can be shipped for use in an instant.

What I claim as new, and desire to secure by Letters Patent of the United States, is—

1. The combination of the clamp D, having spring-catch $d$, and rock-shafts C, provided with circular nuts $c$, with the U-shaped frame B, having slots H and circular recesses I at its ends, substantially as shown and set forth.

2. The oar-sleeve F, having inwardly-projecting pins $f$, securing-screws $f'$, and external annular flanges, $f^2$, combined with the clamp D $d$ and U-frame, as set forth.

3. The combination of the bracket A, U-shaped frame B, having slots H and recesses I, clamp D, having rock-shaft C, provided with nuts $c$, and oar-sleeve F, as shown and set forth.

In testimony that I claim the foregoing as my own I have hereunto affixed my signature in presence of two witnesses.

JOSEPH BEAUDREAU.

Witnesses:
DANIEL V. SAMUELS,
HARRY H. FOSTER.